United States Patent [19]

Sobajima et al.

[11] 4,206,615

[45] Jun. 10, 1980

[54] INSULATIVE MULTI-PANE WINDOW STRUCTURE OF REFRIGERATOR OR FREEZER

[75] Inventors: Shigenobu Sobajima, Hachioji; Kiyoshi Chiba, Niiza; Kunio Itoh, Hino; Utami Yonemura, Hino; Yuji Mitani, Hino, all of Japan

[73] Assignee: Teijin Limited, Osaka, Japan

[21] Appl. No.: 946,529

[22] Filed: Sep. 27, 1978

[51] Int. Cl.$^2$ .................... A47F 3/04; F25D 21/06
[52] U.S. Cl. .................................. 62/248; 62/255; 62/275; 219/218
[58] Field of Search ............... 62/248, 255, 275; 219/203, 218

[56] References Cited

U.S. PATENT DOCUMENTS

| | | | |
|---|---|---|---|
| 3,241,899 | 3/1966 | Donker | 62/255 X |
| 3,403,525 | 10/1968 | Beckwith et al. | 62/255 |
| 3,414,713 | 12/1968 | Reifeiss et al. | 62/248 |
| 3,465,536 | 9/1969 | Vogel et al. | 62/255 |
| 3,710,074 | 1/1973 | Stewart | 219/203 |
| 4,035,608 | 7/1977 | Stromquist et al. | 62/248 |

Primary Examiner—Lloyd L. King
Attorney, Agent, or Firm—Wenderoth, Lind & Ponack

[57] ABSTRACT

An insulative multi-pane window structure of a refrigerator or freezer, said structure being interposable between a colder inside region and a warmer outside region of the refrigerator or freezer to permit vision therebetween and including at least a first pane having a surface exposed in use to humidity-bearing air in the warmer region and a second pane opposite to and spaced apart from the first pane, at least one of the first and second panes having an infrared reflecting coating attached in a specific manner; characterized in that said infrared reflective coating is a transparent, electrically conductive laminated structure composed of (A) a transparent solid substrate of a film-forming synthetic resin,
(B) a thin layer of an oxide of titanium in contact with the substrate, said layer being derived from a layer of an organic titanium compound and containing organic residual moieties of the organic titanium compound,
(C) a thin layer of an electrically conductive metal in contact with layer (B),
(D) a thin layer of an oxide of titanium in contact with layer (C), and
(E) optionally, a transparent top layer in contact with layer (D).

10 Claims, 21 Drawing Figures

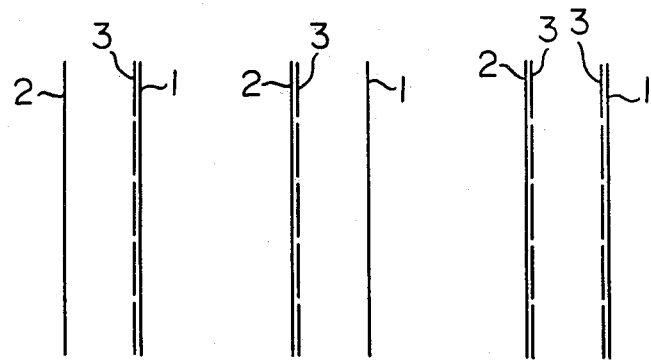
Fig. 1-A    Fig. 1-B    Fig. 1-C
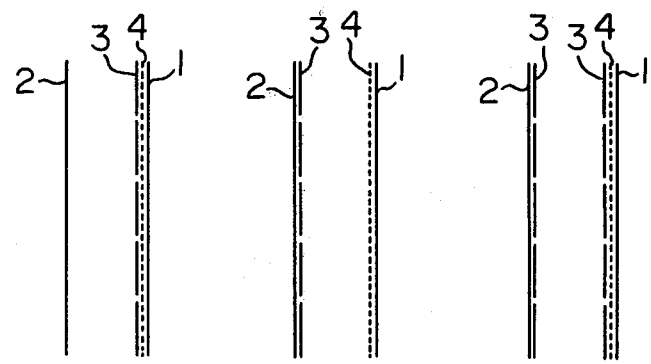
Fig. 1-A'   Fig. 1-B'   Fig. 1-C'
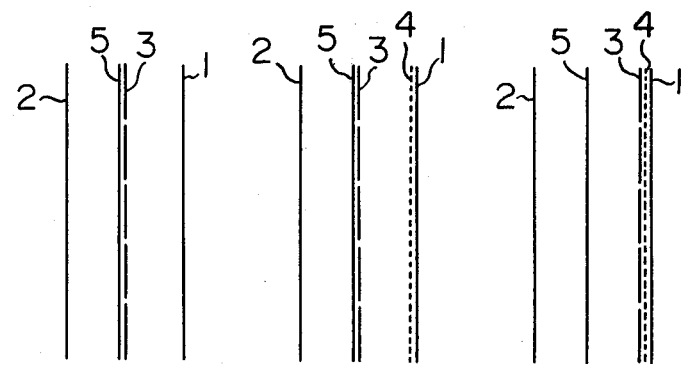
Fig. 1-D    Fig. 1-E    Fig. 1-F

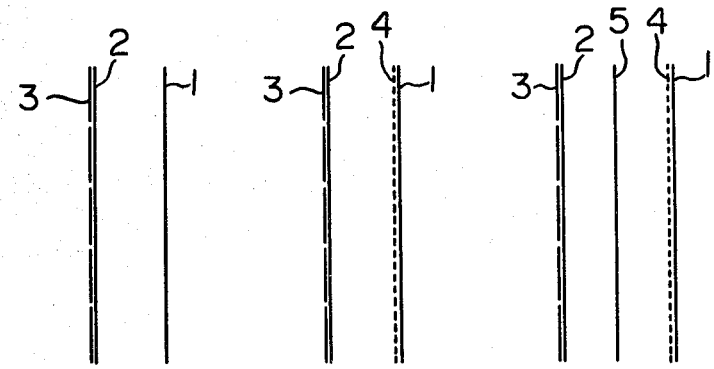
Fig. 2-A    Fig. 2-A'    Fig. 2-B
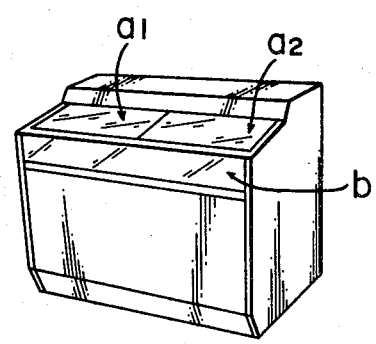
Fig. 3
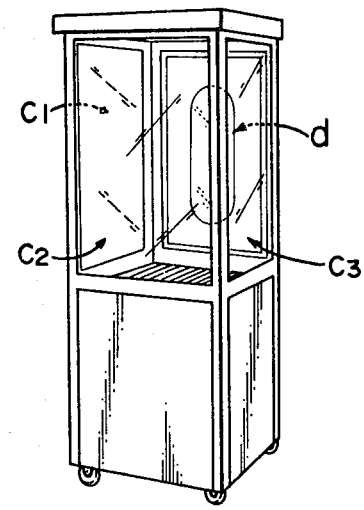
Fig. 4

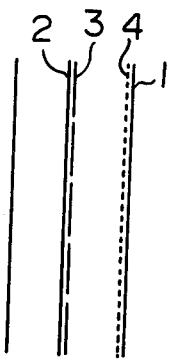
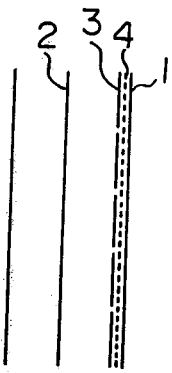
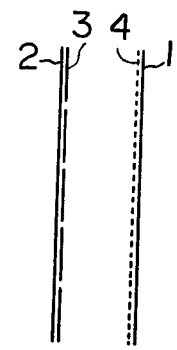
Fig. 5-A   Fig. 5-B   Fig. 5-C
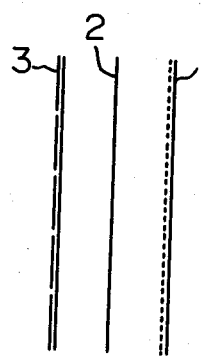
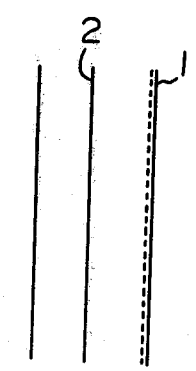
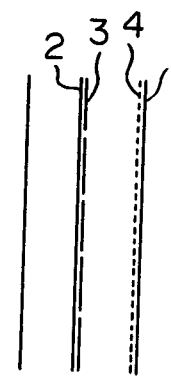
Fig. 5-D   Fig. 5-E   Fig. 5-F
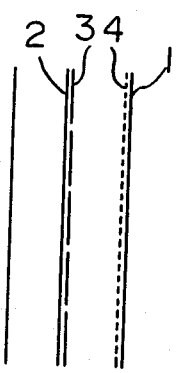
Fig. 5-G

INSULATIVE MULTI-PANE WINDOW STRUCTURE OF REFRIGERATOR OR FREEZER

This invention relates to an insulative multi-pane window structure for a refrigerator or freezer which makes possible a saving in power consumption, prevents condensation and has good viewing characteristics.

More specifically, the invention relates to an insulative multi-pane window structure for a refrigerator or freezer, said structure being interposable between a colder inside region and a warmer outside region of the refrigerator or freezer to permit vision therebetween and including at least a first pane having a surface exposed in use to moisture-bearing air in the warmer region and a second pane opposite to and spaced apart from the first pane, wherein when the refrigerator or freezer is of the forced circulation type, the first pane may optionally have an infrared reflective coating on that surface of the first pane which faces the second pane and also have electrical heating means for heating the first pane by electrical resistance heating, and the second pane may optionally have an infrared reflective coating attached to that surface of the second pane which faces the first pane, said infrared reflective coating being present on at least one of the first and second panes, and wherein when the refrigerator or freezer is of the natural circulation type, the first pane may optionally have electrical heating means for heating the first pane by electrical resistance heating, and the second pane has an infrared reflective coating attached to that surface of the second pane which faces the colder region; characterized in that said infrared reflective coating is a transparent, electrically conductive laminated structure composed of (A) a transparent solid substrate of a film-forming synthetic resin, said substrate being attached to the surface of said pane, (B) a thin layer of an oxide of titanium in contact with the substrate, said layer being derived from a layer of an organic titanium compound and containing organic residual moieties of the organic titanium compound, (C) a thin layer of an electrically conductive metal in contact with layer (B), (D) a thin layer of an oxide of titanium in contact with layer (C), and (E) optionally, a transparent top layer in contact with layer (D).

According to the present-day system of distribution of merchandize, it is a widespread practice to store, transport and sell foodstuffs and beverages in the frozen or refrigerated state, and there are a number of cases in which frozen or refrigerated foods and beverages are offered for sale in display cases, especially in supermarkets or in automatic vending machines. The window of such display cases is made up of, for example, an insulative multi-pane window structure which is interposable between a colder inside region and a warmer outside region to permit vision therebetween and includes at least a first pane having a surface exposed in use to moisture bearing air in the warmer region and a second pane opposite to and spaced apart from the first pane, the first pane optionally having an electrical heating means for heating the first pane by electrical resistance heating.

The window structure composed of a multiplicity of transparent panes, usually glass panes, has a greater ability to insulate against heat transfer than a window structure with one glass pane, but its ability is not entirely satisfactory and is still desired to be improved. Owing mainly to the insufficient heat insulating ability, such a window structure shows a tendency for condensation or frost to form at a comparatively low relative humidity on that surface of the window structure which faces the moisture bearing air in the warmer region, and consequently, it makes viewing of the merchandize in the refrigerator or freezer difficult. Furthermore, the motor of a cooler for maintaining the inside temperature of the refrigerator or freezer at a predetermined point must be operated for a longer period of time, and the power consumption naturally increases.

In an attempt to increase the heat insulating ability and reduce the tendency to from condensation or frost, a suggestion has been made to apply an infrared or heat reflective coating to the surface of a pane. For example, U.S. Pat. No. 3,710,074 (patented Jan. 9, 1973) discloses a multiple glazed window unit for separating a thermally controlled space from an environment comprising two transparent panels disposed in parallel relation to each other, designated as a first panel for facing said controlled space and a second panel for facing said environment, spacing means marginally disposed between the panels separating one from another and sealing means disposed around the panel edges forming a hermetically sealed enclosed space therebetween, a transparent electroconductive coating on the enclosed space surface of said first panel and electrical source means connected thereto and a transparent, light and heat reflecting coating having an absolute infrared reflectance of at least 0.7 on the enclosed space surface of said panel, said light and heat reflecting coating having sufficient visible light reflectance to substantially eliminate apparent iridescence observable from said electroconductive coating. The patent discloses the use of metallic or metal oxide materials as the heat reflecting coating, and gives as examples copper and other metals such as Au, Ag, Cr, Pt, Pd, Ni and metals from the 4th period of the periodic table.

U.S. Pat. No. 4,035,608 (patented July 12, 1977) discloses an improved insulative multi-pane window structure interposable between a colder region and a warmer region to permit vision therebetween, of the type having at least a first pane having a surface exposed in use to moisture bearing air in the warmer region and a second pane opposite to and spaced apart from the first pane, having electrical heating means on the first pane for heating the first pane by electrical resistance heating, wherein a substantially transparent, electrically inactive infrared reflective coating is formed on the second pane. This patent gives as an example a metal or metallic oxide such as tin oxide as the infrared reflective coating.

It has been found that an attempt to obtain a satisfactory increase in insulating ability in the window structures of these prior patents results in difficulty in avoiding a deterioration in transparency, which is undesirable for using the window structure in freezing or refrigerating display cases, and such a window structure is also unsatisfactory in regard to the saving of electrical energy and power consumption. Accordingly, no improvement has been found to be achievable in regard to power consumption, condensation or dew formation, and transparency.

We have now found that a window structure of a refrigerator or freezer which can achieve satisfactory improvements in all of electrical energy saving, prevention of condensation or frost, and transparency can be provided by utilizing the transparent, electrically conductive laminated structure described in our co-pending Application Ser. No. 889,450 now U.S. Pat. No. 4,166,876.

We have also found that there is a restriction on the application of the aforesaid laminated structure to the surface of a pane, and in order to improve the aforesaid properties most satisfactorily, the laminated structure should be applied to at least one of the surfaces of the first pane and the second pane which face each other in a "forced circulation type" refrigerator or freezer in which cold air within a cooling zone is forcedly circulated by a mechanical means such as a fan or blower (of course, the laminated structure may be present on other panes that may be present in addition to the first and second ones), or it should be applied to that surface of the second pane which faces the colder region in a natural circulation type refrigerator or freezer in which such forced circulation of cold air is not performed.

We have further discovered that a condensation preventing effect comparable to that obtained by the conventional devices described hereinabove which are provided with electrical heating means for heating the first pane by electrical resistance heating can be achieved more efficiently and more economically without providing such electrical heating means in the first pane.

It is an object of this invention, therefore, to provide an insulative multi-pane window structure for a refrigerator or freezer having the aforesaid improved properties.

The above and other objects and advantages of the invention will become more apparent from the following description taken with the accompanying drawings, in which:

FIGS. 1A–1F are schematic sectional views of the window structure of the invention;

FIGS. 2A–2B are schematic sectional views of another embodiment of the window structure of the invention;

FIGS. 3 and 4 are perspective views of natural circulation cooling and forced circulation cooling cabinets according to the invention;

FIGS. 5A–5D and 5F and 5G are schematic sectional views of further embodiments of window structures according to the invention; and FIG. 5E is a schematic sectional view of a window structure for use in comparative tests of the window structures of the present invention.

The insulative multi-pane window structure of the invention, when used in a forced circulation type refrigerator or freezer, is such that it is interposable between a colder inside region and a warmer outside region of the refrigerator or freezer to permit vision therebetween and includes at least a first pane having a surface exposed in use to moisture-bearing air in the warmer region and a second pane opposite to and spaced from the first pane, said first pane optionally having an infrared reflective coating attached to that surface of the first pane which faces the second pane and also optionally having electrical heating means for heating the first pane by electrical resistance heating, and said second pane optionally having an infrared reflective coating attached to that surface of the second pane which faces the first pane, said infrared reflective coating being present on at least one of the first and second panes; characterized in that said infrared reflective coating is a transparent, electrically conductive laminated structure composed of (A) a transparent solid substrate of a film-forming synthetic resin, said substrate being attached to the surface of said pane, (B) a thin layer of an oxide of titanium in contact with the substrate, said layer being derived from a layer of an organic titanium compound and containing organic residual moieties of the organic titanium compound, (C) a thin layer of an electrically conductive metal in contact with layer (B), (D) a thin layer of an oxide of titanium in contact with layer (C), and (E) optionally, a transparent top layer in contact with layer (D).

FIG. 1-A to FIG. 1-F of the accompanying drawings show several examples of the aforesaid structure in schematic sectional views. In these Figures, the reference numeral 1 represents the first pane having a surface exposed in use to moisture-bearing air in the warmer region which may have an electrical heating means 4; the reference numeral 2, the second pane opposite to and spaced apart from the first pane 1; and 3, the infrared reflective coating in accordance with this invention. FIGS. 1-D, 1-E and 1-F show examples in which a third pane 5 is provided in addition to the first and second panes.

Among these embodiments, the structures shown in FIGS. 1-A, 1-B, 1-A', 1-B', 1-D, 1-E, and 1-F are preferred.

In another aspect, the insulative multi-pane window structure of this invention, when used in a natural circulation type refrigerator or freezer, has a structure such that it is disposable between a colder inside region and a warmer outside region of the refrigerator or freezer to permit vision therebetween and includes at least a first pane having a surface exposed in use to moisture-bearing air in the warmer region and optionally having electrical heating means for heating the first pane by electrical resistance heating and a second pane opposite to and spaced apart from the first pane and having an infrared reflective coating; characterized in that said infrared reflective coating is a transparent, electrically conductive laminated structure composed of (A) a transparent solid substrate of a film-forming synthetic resin, said substrate being attached to that surface of the second pane which faces the colder region, (B) a thin layer of an oxide of titanium in contact with the substrate, said layer being derived from a layer of an organic titanium compound and containing organic residual moieties of the organic titanium compound, (C) a thin layer of an electrically conductive metal in contact with layer (B), (D) a thin layer of an oxide of titanium in contact with layer (C), and (E) optionally, a transparent top layer in contact with layer (D).

FIGS. 2-A and 2-B of the accompanying drawings show several examples of the above-described structure in schematic sectional views in which the reference numerals 1 to 5 designate the same parts described above with regard to FIG. 1.

In the structures described above, a transparent glass plate is most commonly used as a material for the first and second panes. If desired, one or both of these panes may be made of a transparent synthetic resin sheet or plate. Examples of such synthetic resins are polyester resins such as polyethylene terephthalate, poly(ethylene 2,6-naphthalate) or polybutylene terephthalate, polycarbonate resins, polyvinyl chloride, polysulfone, polyphenylene oxide, polymethacrylates, polyacrylates, polystyrene, polyamide resins, polyimide resins, and celluloses such as cellophane or cellulose triacetate. Of these, polymethacrylates, polyacrylates, polyvinyl chloride, polycarbonate resins, and polyethylene terephthalate in sheet form are preferred.

The first pane 1 may optionally have an electrical heating means 4 for heating the first panel. Such a heating means is known, and is an electrically conductive body constituted by a thin film of a metal and/or a metal oxide on a transparent plate, sheet or film at its entire surface or in lines. More specifically, it is a panel-type heater consisting of a glass sheet and a thin film of a metal oxide such as tin oxide or a metal such as gold formed on it, or a heater of the type in which an electrically conductive wire material is provided on the surface of a glass sheet. Such a heater may be present on the surface of glass or interposed between the constituent sheets of a laminate glass sheet. The heater may be applied to either surface of the first pane.

When the heater is to be provided on that surface of the first pane which will be exposed in use to moisture bearing air in the warmer region, an insulating coating acting concurrently as a protective cover must be provided on the surface of the heater so that the user will not receive an electrical shock.

The infrared reflective coating used in the invention is a transparent, electrically conductive laminated structure composed of (A) a transparent solid substrate of a film-forming synthetic resin, (B) a thin layer of an oxide of titanium in contact with the substrate (A), said layer being derived from a layer of an organic titanium compound and containing organic residual moieites of the organic titanium compound, (C) a thin layer of an electrically conductive metal in contact with layer (B), (D) a thin layer of an oxide of titanium in contact with layer (C), which is preferably derived from a layer of an organic titanium compound and containing organic residual moieties of the organic titanium compound, and (E) optionally, a transparent top layer in contact with layer (D).

The infrared reflective structure used in the invention can be prepared at low cost and high manufacturing speeds by industrially easy operations and simple apparatus by the following steps (1) to (5):

(1) A step of coating the surface of the transparent solid substrate of a film-forming synthetic resin with a solution of an organic titanium compound in solvent;

(2) the step of drying the coated layer obtained in step (1) in such a manner as to leave part of the organic moieties of the organic titanium compound in the coated layer under conditions which induce hydrolysis of the organic titanium compound;

(3) the step of forming a thin layer of an electrically conductive metal on the dried layer formed in step (2) of an oxide of titanium containing organic residual moieties of the organic titanium compound;

(4) the step of forming a layer of an oxide of titanium on the thin layer of electrically conductive metal formed in step (3) (preferably, the layer is formed by similar means to steps (1) and (2); and (5) an optional step of forming a transparent top layer on the layer obtained in step (4).

In the transparent, electrically conductive laminated structure used in the invention, the organic residual moiety contact of layer (B), and preferably of both layers (B) and (D), should preferably be 0.1 to 30% by weight, and more preferably 1.0 to 10%, based on the organic groups contained in the layer of the organic titanium compound.

The organic residual moiety content of the organic titanium compound contained in the layer of an oxide of titanium derived from the organic titanium compound is determined by the following procedure.

A solution is prepared by mixing water and methanol in a weight ratio of 1:1 and dissolving potassium hydroxide in a concentration of 10% by weight. A sample laminate is cut into square-shaped small pieces each side measuring about 2 mm, and these pieces are added to the solution so that they are present in an 20 cm$^2$/ml. They are immersed in the solution for 24 hours at room temperature to extract the organic components. The amount ($W_2$) of the organic components per unit area is obtained by the quantitative determination of ions which is performed by mass fragmentography on a gas chromatographic mass analyzer (Model LKB 900 made by Shimadzu Seisakusho) using a glass column, 3 mm in diameter and 3 m in length, packed with Chromosorb W (60–80 mesh) having 30 parts by weight of PEG-20 attached to it.

When, for example, tetrabutyl titanate is used as the organic titanium compound, a component having a mass number corresponding to butyl is weighed for this determination. If an alcohol is used as a solvent at the time of coating the tetrabutyl titanate, there is a possibility of ester-interchange between them. Accordingly, a component with a mass number corresponding to the alkyl component of the alcohol is also weighed and the sum of the amounts of these two components is set as the amount ($W_2$) of the organic residual moieties in the titanium compound.

The content (% by weight) of organic residual moieties in the titanium oxide coating is determined as follows:

The thickness of the titanium oxide coatings are accurately measured by an interference-type microscope in accordance with the Tolansky technique in "Handbook of Thin Film Technology", Maissel & Glang, McGraw-Hill (1970), p. 11-8. On the other hand, the Ti atom intensities of these titanium oxide coatings are measured by a fluorescent X-ray analysis. A calibration curve is prepared from the measured thicknesses and Ti atom intensities. Thus, the thickness of a given titanium oxide coating can be known from the calibration curve if its Ti atom intensity is measured by fluorescent X-ray analysis. The density of the titanium oxide coating is taken as 2.5 g/cm$^3$, and the weight ($W_1$) of the titanium oxide coating per unit area is calculated.

The content (% by weight) of the organic residual moieties of the titanium oxide coating is calculated from the following equation.

$$\text{Content of organic residual moieties} = \frac{W_2}{W_1} \times 100$$

The film-forming synthetic resin layer (A) used as the transparent solid substrate in the invention can be formed of any film-forming synthetic resin which can withstand the drying temperature used in the drying of the layer (B) of organic titanium compound or layer (A) in such a manner as to leave part of the organic moieties of the organic titanium compound under conditions which induce hydrolysis of the organic titanium compound.

Examples of such film-forming synthetic resins are thermoplastic resins, for example polyester resins such as polyethylene terephthalate, polyethylene naphthalate, polybutylene terephthalate and polycarbonate, acrylic resins, polystyrene resin, polyolefin resins such as polyethylene and polypropylene resins, polyamide resins, polyvinyl fluoride resin, and blends of these resins; and solvent-soluble film-forming resins such as polyvinyl alcohol, polyacrylonitrile, polyurethane, aromatic polyamides and polyimide resins.

The film-forming synthetic resins exemplified above are not limited to homopolymers and may include copolymers, blends and laminates. These resins may be in any desired form such as a film, sheet, plate, rod, pipe, block or filament. In the present invention, the film-forming synthetic resin used as a substrate is preferably a film or sheet of a polyester. An especially advantageous substrate is a polyester film or sheet having a visible light transmission of at least 80% and a thickness of 6 to 250 $\mu$m, preferably 20 to 200 $\mu$m. Polyalkylene terephthalates and polyalkylene naphthalates are particularly preferred. Preferably, the polyester film or sheet is oriented. Particularly preferred is a polyester film or sheet oriented in at least one direction (preferably, biaxially) and having a refractive index in the oriented direction of 1.57 to 1.58 and b 1.48 to 1.57 in the thickness direction and a density of 1.340 to 1.390 g/cm$^3$.

In the laminated structure used in the invention, a thin layer (B) of an oxide of titanium derived from a layer of an organic titanium compound and containing organic residual moieties of the organic titanium compound is provided in contact with the substrate (A).

The layer (B) can be formed by coating the surface of the substrate (A) with a solution of an organic titanium compound in a solvent and drying the resulting coating under such conditions as to hydrolyze the organic titanium compound in the coating to an oxide of titanium but to leave a part of the organic moieties of the organic titanium compound.

Alkyl titanates are suitable as the organic titanium compound. Especially preferred alkyl titanates are those of the following formula

wherein R represents an alkyl group, preferably C$_1$-C$_{20}$ alkyl, more preferably C$_2$-C$_{11}$ alkyl, and l, m and n are positive numbers.

Alkyl titanates of the above formula in which $m = 4 + (l-1) \times 3$, $n = 4 + (l-1) \times 2$, and $l = 1 - 30$ can be advantageously used because of their satisfactory ability to form the layer (B). The value "l" need not be a single value, and may have a distribution. Alkyl titanates having a distribution of l values with a maximum of 15 or less are preferred in view of their hydrolyzability and the viscosity of the coating solution. Use of alkyl titanates of the above formula in which R is a C$_2$-C$_{11}$ alkyl group is preferred in view of good film-formability (e.g., the ease of coating), the satisfactory rate of hydrolysis and the superior mechanical properties and transparency of the resulting coating.

The alkyl titanates may be used as mixtures of two or more members. The alkyl titanate is dissolved in an organic solvent, and the solution is coated on the surface of substrate (A). It is hydrolyzed in the presence of atmospheric moisture and dealkylhydrooxidized by the subsequent condensation reaction to form a network structure. By choosing the coating conditions, the alkyl titanate approximates titanium oxide.

The layer (B) of an oxide of titanium should contain preferably 0.1 to 30% by weight, and more preferably 1.0 to 10% by weight, of organic residual moieties based on the organic groups contained in the organic titanium compound when measured by the procedure described hereinabove. By drying the layer (B) under such conditions as to leave organic residual moieties, the oxide of titanium converted from the alkyl titanate amounts to preferably about 70 to about 99.9% by weight, more preferably about 90 to about 99.0% by weight, based on the weight of layer (B).

The drying should not be effected under conditions which will cause a loss of substantially all of the organic groups of the organic titanium compound which are present in the layer of the organic titanium compound from which to form layer (B). The drying conditions for converting the alkyl titanate into an oxide of titanium under such conditions as to leave part of the organic moieties of the alkyl titanate can be changed as required depending upon the type of the layer of the organic titanium compound, the heating conditions, the thickness of the layer and so forth. For example, the drying can be carried out at a temperature of about 50° to about 200° C., preferably about 90° to about 150° C., for a period of about 10 seconds to about 10 hours, preferably about 60 seconds to about 600 seconds.

A hot air oven and an infrared ray heater are among the devices which can be used to perform the drying.

Specific examples of alkyl titanates include tetrabutyl titanate, tetraethyl titanate, tetrapropyl titanate, tetrastearyl titanate, tetra-2-ethylhexyl titanate and diisopropoxytitanium-bis-acetylacetonate. Tetrabutyl titanate and tetrapropyl titanate are preferred. These alkyl titanates can be used as such, but their precondensates in the form of a dimer, tetramer or decamer can also be used suitably.

Prior to use, these alkyl titanates may be stabilized with acetyl acetone or the like.

Suitable organic solvents for use in forming a layer of alkyl titanate are those which can fully dissolve the alkyl titanate, have an affinity for the surface of the substrate and which are easy to coat and to dry after coating. Such organic solvents are, for example, hydrocarbons, alcohols, ethers, esters, carboxylic acids, and halogenated hydrocarbons. Specific examples include hexane, cyclohexane, heptane, octane, methylcyclohexane, toluene, benzene, xylene, octene, nonene, solvent naphtha, methanol, ethanol, isopropanol, butanol, pentanol, cyclohexanol, methyl cyclohxanol, phenol, cresol, ethyl ether, propyl ether, tetrahydrofuran, dioxane, acetone, cyclohexanone, methyl ethyl ketone, methyl isobutyl ketone, methyl acetate, ethyl acetate, propyl acetate, butyl acetate, ethyl propionate, methyl benzoate, glacial acetic acid, chloroform, carbon tetrachloride, trichloroethylene, trichloroethane, chlorobenzene, dibromoethane, methyl cellosolve, cellosolve, and cellosolve acetate. Isopropanol, butanol, n-hexane and toluene are preferred. These organic solvents can be used either alone or as mixtures of two or more members. Hydrous solvents may also be used as required.

The solvent solution for forming layer (B) can be easily prepared by dissolving the organic titanium compound in the organic solvent. If desired, the dissolving may be accelerated by heating to such an extent as not to impair the intended effect of leaving a part of the organic residual moieties. It is also permissible to add some amount of another resin component soluble in the organic solvent for the purpose of improving the properties of the resulting coated film, such as its adhesion, refractive index, color and hardness. Such other resin component may, for example, be a solvent-soluble resin such as a silicon resin, acrylic resin, epoxy resin, or polyurethane resin.

The concentration of the alkyl titanate in the organic solvent solution (coating solution) can be changed as desired. Where it is desired to form a uniform thin layer with a thickness of several hundred Angstroms, the suitable concentration is generally 0.1 to 30% by weight, preferably 0.5 to 10% by weight, especially preferably 1 to 7% by weight.

Any known coating means can be used to coat the substrate of a film-forming synthetic resin with the solvent solution of an organic titanium compound.

When coating the surface of a shaped article with this solution, not only a dip coating method, a spray coating method and a spinner coating method, but also other methods using common coating machines such as a gravure coater, Meyer bar coater or reverse roll coater are available. For example, when coating a smooth solid substrate such as a film or sheet surface, a gravure coater or a Meyer bar coater is preferably used from the viewpoint of controlling of the film thickness and its uniformity. In the case of coating an uneven solid substrate, a spray coating machine is preferred. Simultaneously with or after coating the solution, the solvent is evaporated at room temperature or above.

As stated hereinbove, the drying should be effected in such a manner as to leave part of the organic residual moieties derived from the organic titanium compound in the layer of an oxide of titanium obtained by drying.

By leaving a part of such organic residual moieties, preferably in the amount specified hereinabove, the adhesion of layer (B) to the solid substrate (A) and also to the thin layer (C) of conductive metal formed on the surface of layer (B) can be improved. Furthermore, this can lead to a removal of adverse effects of the transparency of the laminated structure which might be caused by the irregularity of the contact surfaces between the individual layers of the laminated structure, and therefore, it is possible to obtain with good quality reproducibility a transparent, electrically conductive film or selectively transparent film having superior transparency over a wide wavelength region and superior surface conductivity.

Since the thin layer (B) of an oxide of titanium contains part of the organic residual moieties derived from the organic titanium compound, its refractive index is lower than that of a titanium oxide layer obtained by a conventional sputtering or vacuum depositing process; it is about 1.6 to 2.2 in the visible region. The laminated structure of the invention, therefore, affords various advantages among which are:

(a) It has a uniform light transmission over a wide area.

(b) It has superior adhesion to shaped articles.

(c) It has a high light transmission over a wide wavelength range in the visible region.

Furthermore, since the layer (B) of an oxide of titanium containing organic residual moieties of the organic titanium compound can be formed by coating and drying means, it can achieve other advantages over the use of conventional sputtering, vacuum depositing or similar means. Among these advantages are:

(d) The speed of forming the layer (B) is faster, and the operation and apparatus for forming the layer are simpler and less expensive.

(e) The composition and thickness of the resulting layer are easy to control.

(f) The resulting layer has superior flexibility and has good resistance to breakage by stress caused by bending.

The thickness of the thin layer (B) can be optionally changed, but it should preferably be 50 to 100 Å, more preferably 200 to 500 Å, especially preferably 200 to 400 Å.

In the next place, a thin layer (C) of an electrically conductive metal is formed on the thin layer (B) formed in the manner described above. The conductive metal may preferably be at least one metal selected from silver, gold and copper, and alloys thereof. Alloys of gold, silver and copper are preferred for obtaining a selectively light-transmitting layer (C) having a great ability to reflect infrared rays.

The thickness of the thin metal layer (C) is not particularly limited so long as it meets the requirements of a transparent, electrically conductive layer or selectively transparent layer. The thickness should have continuity at least to a certain extent of the total area in order for the layer to have an infrared reflecting ability or electric conductivity. The thickness of the coated layer which has a continuous structure as compared to an island structure should be at least about 30 Å. From the standpoint of transparency to solar energy, the thickness is preferably 600 Å or less, more preferably 500 Å or less. The less the thickness of the thin metal layer, the wider is the transparent region. Thicknesses of not more than 200 Å are preferred in order to increase transparency. Thicknesses of at least 50 Å are preferred to give the layer sufficient conductivity or sufficient ability to reflect infrared rays.

The thin metal layer (C) can be formed, for example, by vacuum deposition, cathode sputtering, plasma spraying, vapor phase plating, electroless plating, electroplating, chemical coating, or a combination of these. But when a shaped article having a smooth surface, such as a film or sheet, is used as the substrate in making the laminated structure used in the invention, the vacuum deposition process is especially suitable because of the uniformity of the resulting layer (C), the ease of forming the layer (C), and the speed of its formation. Vacuum deposition of a metal is not industrially detrimental as that of a compound such as an oxide of titanium in layer (B).

It is especially preferred that the thin layer (C) of conductive metal in contact with the thin layer (B) should be a unitary thin metal layer containing, for example, silver and copper together. By the term "unitary thin metal layer", as used herein, is meant a thin metal film in which silver atoms and copper atoms substantially coexist to form a single layer without forming independent layers of silver and copper. In some cases, the unitary layer will be completely uniform, but in others, it may be nonuniform to some extent. It should however exist at least as a single unitary layer.

This preferred embodiment can advantageously correct the tendency of a thin layer (C) consisting entirely of silver to degrade, which is caused when it is exposed to intense irradiation of sunlight and the like in the air or to irradiation of relatively weak light over a prolonged period of time, or when it is heated at high temperatures in the air, or when it is exposed to a reactive gaseous atmosphere such as hydrogen sulfide or sulfur dioxide. Investigations of the present inventors have shown that when the thin layer (C) consists only of silver, the aforesaid tendency to degrade is caused mainly by the migration of silver to the surface of layer (D). In the preferred embodiment of this invention, therefore, a layer composed of silver and copper is utilized.

In one preferred embodiment of the invention, it is recommended to use as the thin layer (C), a thin layer of silver containing about 1 to about 30% by weight, preferably about 3 to about 25% by weight, more preferably about 5 to about 20% by weight, of copper. The layer (C) may also contain other metals such as gold, aluminum, nickel, palladium, platinum, indium, tin, cadmium, germanium and zinc in minor amounts which do not impair the durability of the resulting coating.

Sputtering of an alloy or a multiplicity of metals is suitable for the formation of layer (C) in accordance with the preferred embodiment of the invention. In the vacuum deposition process, deposition of a multiplicity of metals, or a combination of an alloy evaporant source with electron beam heating, high frequency induction heating, resistance heating, of flash evaporation is preferred.

A thin layer (D) of an oxide of titanium is then formed on the surface of the layer (C) of conductive metal formed in the manner described above.

This thin layer (D) should preferably be the same as the thin layer (B) of an oxide of titanium. The layer (D) is formed by known techniques such as vacuum deposition, reactive vapor deposition or sputtering of titanium metal or an oxide of titanium.

The thickness of the layer (D) of an oxide of titanium may also be the same as that of the layer (B). In particular, when the thin layer (D) is a layer of an oxide of titanium derived from a layer of an organic titanium compound and containing organic residual moieties, it has the advantage of having a larger contact angle with respect to water and therefore higher water repellency than a thin layer of an oxide of titanium not containing organic residual moieties.

The laminated structure used in the invention may optionally have a transparent top layer (E) in contact with the layer (D) in addition to layers (A), (B), (C) and (D). The transparent top layer can be such as to improve surface hardness, weatherability, etc.

Materials for the top layer (E) include organic materials such as acrylic resins (e.g., polymethyl methacrylate), silicon-containing resins (e.g., a polymer obtained from ethyl silicate), polyester resins, melamine resins and fluorocarbons resins, and inorganic materials such as silicon oxide and magnesium fluoride. Where it is desired to improve weatherability or surface hardness, acrylic resins and silicon-containing resins are especially preferred.

In forming the top layer (E), the organic material can be coated from a solution or thereof by a sprayer or coating machine, whereas the inorganic material can be applied by general methods such as vacuum deposition and sputtering.

The laminated structure having transparency and electric conductivity, when having no protective coating, has a light transmission at 500 nm of at least 50%, preferably at least 60%, especially preferably at least 70%, a reflectance at 9 to 10$\mu$ of at least 70%, preferably at least 80%, especially preferably at least 90%, and a surface resistance of not more than $10^8$ ohms/square.

The transmission of visible light, surface resistance, and infrared reflectance of the laminated structure can be changed optionally by adjusting the thickness of the thin metal layer (C) and the thin titanium oxide layers (B) and (D).

In the present invention, the laminated structure described above is combined with the multi-pane window structure so that the transparent solid substrate (A) is attached to the surface of a pane. This can be achieved, for example, by bonding the surface of the pane and the transparent solid substrate (A) through a suitable adhesive solution or a tackifier; or by providing a two-surface adhesive tape on the marginal portion of the substrate (A), and bonding it to the surface of the pane by the adhesive tape. Such an adhesive or tackifier may be known ones such as acrylic adhesives and tackifiers, and butyral type adhesives. It is possible to add small amounts of an ultraviolet absorber, pigment, etc. to the adhesive or tackifier.

The following Examples and Comparative Examples illustrate the present invention further.

EXAMPLE 1 and Comparative Examples 1 to 5

The properties of the laminated structure used in this invention were compared with those of other laminated structures in a freezer display case of the natural circulation cooling type as shown in FIG. 3 of the accompanying drawings.

(1) Freezer display case

The freezer display case used was Sanyo Freezer Show Case SCR-2400 having a total inside volume of 243 liters. The display case, in outside dimension, had a height of 900 mm, a length of 1130 mm and a width of 725 mm, and included two-pane windows $a_1$ and $a_2$ each having a size of 32 cm $\times$ 46 cm on top, a heater-equipped two-pane window b having a size of 10 cm $\times$ 105 cm at its front surface (the heater was not operated in this experiment), and a cooler at its rear surface. The temperature of the inside of the case was automatically controlled so that the motor of the cooler would operate at $-16°$ C. and stop at $-21°$ C.

(2) Preparation of a laminated structure

A solution consisting of 3 parts by weight of a tetramer of tetrabutyl titanate, 65 parts by weight of isopropyl alcohol and 32 parts by weight of n-hexane was coated by a bar coater on the surface of a 25 mm-thick polyethylene terephthalate film (A) having a transmission at 0.5 $\mu$m of 86%, and the resulting coating was heat-treated at 100° C. for 5 minutes to form a layer (B) consisting mainly of titanium oxide. The titanium oxide layer (a dielectric body with a high refractive index) had a thickness of 300 Å. This titanium oxide layer also served as an anchor coat for increasing adhesion to the polyethylene terephthalate film. An alloy of silver and copper was vacuum deposited on the titanium oxide layer at $5\times 10^{-5}$ torr to form a vacuum-deposited metal layer (C) having a thickness of 150 Å. In layer (C), the atomic mole ratio of silver to copper was 92:8. A titanium oxide layer (D) was formed on layer (C) in the same way as in the formation of layer (B). The thickness of the titanium oxide layer (D) was 270 Å. On top of the layer (D) an acrylic resin (a product of Mitsubishi Rayon Co., Ltd.) was coated to form a top transparent layer having a thickness of about $0.1\mu$.

(3) Window structure

The laminated structure was attached to that surface of the second pane of each of the windows $a_1$ and $a_2$ which faced the colder region (Example 1).

The laminated structure was attached to that surface of the first pane of each of the windows $a_1$ and $a_2$ which faced the second pane (Comparative Example 1).

The laminated structure was attached to that surface of the second pane of each of the window $a_1$ and $a_2$ which faces the first pane (Comparative Example 2).

The laminated structure was not used in the display case (Comparative Example 3).

A tin oxide layer having a thickness of 3500 Å was formed from $SnCl_4$ and $SbCl_3$ by a chemical vapor deposition method on that surface of the second pane of each of the windows $a_1$ and $a_2$ which faced the colder region (Comparative Example 4).

A gold layer having a thickness of 180 Å was formed by sputtering on that surface of the second pane of each of the windows $a_1$ and $a_2$ which faced the colder region (Comparative Example 5).

(4) Experiment

(A) Test on the prevention of dew formation

The freezer display case having the laminated structure attached as described above was placed in an atmosphere kept at 30° C. and varying relative humidities, and operated. The motor of the cooler of the display case was adapted to carry out an on-off action by a temperature control device, and the temperature of the inside of the display case was maintained between $-16°$ C. and $-21°$ C. Twenty-four hours after initiation of the operation, the surface temperature of that surface of the first pane which was exposed to moisture bearing air in the warmer region was measured by a thermocouple, and the temperature at which condensation occurred was also measured.

The minimum relative humidity (%) of the moisture bearing air which caused condensation on that surface of the first pane which faced the warmer region was determined, and defined as a dew prevention value (%) at 30° C. Larger dew prevention values show a greater effect of preventing dew formation.

(B) Test on the effect of saving electric energy

The display case was further operated for 100 hours after the 24-hour operation under the aforesaid conditions, and the total operating time of the motor of the cooler during this 100-hour period was measured.

The power saving ratio (%) was calculated in accordance with the following equation.

Power saving ratio $(\%) = (A - Ax/A) \times 100$

A = the total operating time in Comparative Example 3 (in which no infrared reflective coating was used)

Ax = the total operating time in other examples

Since in Comparative Example 3, A equals Ax, the power saving ratio is 0%. Larger power saving ratios show less power consumption.

(C) Test on transparency

The window structures used in the display cases in these examples were separately produced, and their light transmission values at 500 m$\mu$ were measured by a spectrophotometer (Model EPS-3T, made by Hitachi Limited). Larger transmission values show better transparency.

The results of these tests are summarized in Table 1.

Table 1

| Test items | Example 1 | Comparative Example | | | | |
|---|---|---|---|---|---|---|
| | | 1 | 2 | 3 | 4 | 5 |
| Prevention of dew formation at 30° C. (%) | 72 | 65 | 65 | 55 | 63 | 72 |
| Total operating time (hours) | 60 | 64 | 64 | 68 | 63 | 60 |
| Power saving ratio (%) | 12 | 6 | 6 | 0 | 6 | 12 |
| Transparency (%) | 67 | 67 | 67 | 81 | 68 | 36 |

(5) Conclusion

The results of Table 1 show that the present invention produces satisfactory results in the prevention of dew formation, power saving ratio and transparency. In contract, it is noted that in Comparative Examples 1 and 2, the dew prevention and the power saving ratio are unsatisfactory; in Comparative Example 3, the prevention of dew formation and the power saving ratio are even worse; in Comparative Example 4 in which the conventional coating is used, the prevention of dew formation and the power saving ratio are unsatisfactory; and in Comparative Example 5, the transparency is extremely poor.

EXAMPLES 2 to 4 and Comparative Examples 6 to 9

A similar experiment to Example 1 was performed using a freezer display case of the forced circulating type.

(1) Freezer display case

The display case used was Sanden Freezer Show Case AGF-250 having a total inside volume of 254 liters of the type shown in FIG. 4 of the accompanying drawings. It had a height of 1670 mm, a width of 780 mm and a length of 640 mm, and included a door d and heater-equiped three-pane glass windows $c_1$, $c_2$ and $c_3$ each having a size of 540×850 mm. Each window consisted of a first pane 1 of a heater wire-containing laminate glass sheet (thickness 5 mm) and a second pane 2 and a third pane 5 each of which consisted of an ordinary glass sheet (3 mm in thickness). The thickness of each air layer was 6 mm.

In using this display case in the present experiment, one design change was made in this case. Specifically, the heater in the laminate glass sheet was removed, and instead of a tin oxide coating having a thickness of 3500 Å was formed in the laminate glass sheet in the window structure.

A cooler was set up at the bottom part of the display case, and the cooled air was forcedly circulated by a fan. The temperature of the inside of the case was controlled so as to be between −22° C. and −29° C. by an automatic temperature control device.

(2) Laminated structure

The same laminated structure as used in Example 1 was used.

(3) Window structure

In Example 2, the structure of each window was as shown in FIG. 5-A. A laminate glass sheet with a tin oxide coating was provided in contact with moisture-bearing air in the warmer region, and the laminated structure was attached to that surface of the third pane which faced the first pane. The air layer between the first and third panes was 12 mm in thickness, and the air layer between the second and third panes was 6 mm in thickness.

In Example 3, the window structure shown in FIG. 5-B was used. The structure was the same as in Example 2 except that the laminated structure was provided on that surface of the first pane which faced the third pane.

In Example 4, the window structure shown in FIG. 5-C was used. The laminated structure was provided on that surface of the second pane which faced the laminate glass. The thickness of the air layer between the first and second panes was 18 mm.

In Comparative Example 6, the window structure shown in FIG. 5-D was used. The structure was the same as in Example 2 except that the laminated structure was provided on that surface of the second pane which faced the inside of the case.

In Comparative Example 7, the window structure shown in FIG. 5-E was used. This structure was the same as in Example 2 except that no laminated structure was provided.

In Comparative Example 8, the window structure shown in FIG. 5-F was used. The structure was the same as in Example 2 except that a gold layer having a thickness of 180 Å was used instead of the laminated structure.

In Comparative Example 9, the window structure shown in FIG. 5-G was used. The structure was the same as in Example 2 except that an SnO$_2$ layer having a thickness of 3500 Å was provided instead of the laminated structure.

(4) Experiment

The tests (A), (B) and (C) given in Example 1 were performed in an atmosphere kept at 22° C. and varying relative humidities. The power saving ratio (%) was determined by taking the total operating time in Comparative Example 7 as A. The results are shown in Table 2.

Table 2

| Items | Example | | | Comparative Example | | | |
|---|---|---|---|---|---|---|---|
| | 2 | 3 | 4 | 6 | 7 | 8 | 9 |
| Window structure | Fig. 5-A | Fig. 5-B | Fig. 5-C | Fig. 5-D | Fig. 5-E | Fig. 5-F | Fig. 5-G |
| Surface temperature (°C.) | 15.0 | 15.0 | 12.0 | 10.5 | 9.5 | 15.0 | 12.0 |
| Total operating time (hours) | 72.3 | 72.3 | 74.2 | 80.3 | 87.5 | 72.2 | 81.2 |
| Power saving ratio (%) | 17 | 17 | 15 | 9 | 0 | 17 | 8 |
| Prevention of dow formation at 22° C. (%) | 64 | 64 | 55 | 47 | 45 | 64 | 53 |
| Transparency (%) | 51 | 51 | 56 | 51 | 60 | 27 | 52 |

(5) Conclusion

It is seen from the above results that the use of the laminated structure in accordance with this invention produces a great effect of preventing dew formation without using a heater. It is noted that in Examples 2 and 3, the relative humidity at which condensation occurs is as high as 64%, whereas in Comparative Example 9 in which an SnO$_2$ coating was used instead of the laminated structure of the invention, the relative humidity for dew formation was 53%. The gold coating used in Comparative Example 8 was as effective as the laminated structure of the invention in the prevention of dew formation, but the transparency of the window structure was as low as 27% (the transparency of the laminated structure of the invention was as high as 51%). It is further noted that in a forced circulating type refrigerator such as the one used in this experiment, even the laminated structure of the invention, if applied in a mode suitable for a refrigerator of the natural circulating type as in Comparative Example 6, its effect could not be fully achieved, and both the power saving ratio and the dew prevention were lower than those attained in Example 1.

The two-pane window having the laminated structure of the invention (Example 4) had higher dew prevention and power saving ratio than the three-pane window structure not having the laminated structure of the invention (Comparative Example 7).

What we claim is:

1. An insulative multi-pane window structure for a forced circulation type refrigerator or freezer, said structure being interposed between a colder inside region and a warmer outside region of the refrigerator or freezer to permit vision therebetween, said structure comprising at least a first pane having a surface exposed during use to moisture-bearing air in the warmer region and a second pane opposed to and spaced from said first pane, and an infrared reflective coating on at least one surface of the surfaces constituted by the surface of said first pane which faces said second pane, the surface of said second pane which faces said first pane, and, when an intermediate pane is present between said first pane and said second pane, the surfaces of said intermediate pane, said infrared reflective coating being a transparent, electrically conductive laminated structure composed of:

(a) a transparent solid substrate of a film-forming synthetic resin, said substrate being attached to said one surface;

(b) a thin layer of an oxide of titanium in contact with said substrate, said layer being derived from a layer of an organic compound and containing organic residual moieties of the organic titanium compound;

(c) a thin layer of an electrically conductive metal in contact with said thin layer of an oxide of titanium; and (d) a further thin layer of an oxide of titanium in contact with said layer of conductive metal.

2. An insulative multi-pane window structure as claimed in claim 1 in which the electrically conductive metal is an alloy of silver and copper.

3. An insulative multi-pane window structure as claimed in claim 1 in which the electrically conductive metals is an alloy of silver and gold.

4. An insulative multi-pane window structure as claimed in claim 1 in which said laminated structure further comprises a transparent top layer in contact with said further layer of an oxide of titanium.

5. An insulative multi-pane window structure as claimed in claim 1 further comprising an electrical heating means structurally associated with said first pane for heating said first pane.

6. An insulative multi-pane window structure for a natural circulation type refrigerator or freezer, said structure being interposed between a colder inside region and a warmer outside region of the refrigerator or freezer to permit vision therebetween, said structure comprising at least a first pane having a surface exposed during use to moisture-bearing air in the warmer region and a second pane opposed to and spaced from said first pane, and an infrared reflective coating on at least the surface of said second pane which faces away from said first pane and facing the colder region, said infrared reflective coating being a transparent, electrically conductive laminated structure composed of:

(a) a transparent solid substrate of a film-forming synthetic resin, said substrate being attached to said surface of said second pane;

(b) a thin layer of an oxide of titanium in contact with said substrate, said layer being derived from a layer of an organic compound and containing organic residual moieties of the organic titanium compound;

(c) a thin layer of an electrically conductive metal in contact with said thin layer of an oxide of titanium; and (d) a further thin layer of an oxide of titanium in contact with said layer of conductive metal.

7. An insulative multi-pane window structure as claimed in claim 6 in which the electrically conductive metal is an alloy of silver and copper.

8. An insulative multi-pane window structure as claimed in claim 6 in which the electrically conductive metals is an alloy of silver and gold.

9. An insulative multi-pane window structure as claimed in claim 4 in which said laminated structure further comprises a transparent top layer in contact with said further layer of an oxide of titanium.

10. An insulative multi-pane window structure as claimed in claim 4 further comprising an electrical heating means structurally associated with said first pane for heating said first pane.

* * * * *